(12) United States Patent
Kranz et al.

(10) Patent No.: US 8,708,581 B2
(45) Date of Patent: Apr. 29, 2014

(54) MIRROR ARRANGEMENT FOR REFLEX CAMERAS

(75) Inventors: Gerhard Kranz, Wetzlar (DE); Christoph Knapp, Dornburg (DE)

(73) Assignee: Leica Camera AG, Solms (DE)

( * ) Notice: Subject to any disclaimer, the term of this patent is extended or adjusted under 35 U.S.C. 154(b) by 46 days.

(21) Appl. No.: 13/119,294

(22) PCT Filed: Sep. 15, 2009

(86) PCT No.: PCT/DE2009/001301
§ 371 (c)(1),
(2), (4) Date: Mar. 16, 2011

(87) PCT Pub. No.: WO2010/031391
PCT Pub. Date: Mar. 25, 2010

(65) Prior Publication Data
US 2011/0170850 A1     Jul. 14, 2011

(30) Foreign Application Priority Data

Sep. 18, 2008 (DE) .......................... 10 2008 047 969

(51) Int. Cl.
*G03B 19/12* (2006.01)
(52) U.S. Cl.
USPC .......................................... 396/358; 359/872
(58) Field of Classification Search
CPC ........ G03B 17/00; G03B 17/02; G03B 19/12;
G03B 19/20; G03B 2217/00; G03B 2217/002;
G03B 2219/00; G03B 2219/02
USPC .......................................... 396/358; 359/872
See application file for complete search history.

(56) References Cited

U.S. PATENT DOCUMENTS

| | | | |
|---|---|---|---|
| 4,068,246 A | | 1/1978 | Arai |
| 4,348,088 A | | 9/1982 | Yamamichi et al. |
| 4,668,065 A | * | 5/1987 | Tanaka et al. ................. 396/358 |
| 4,720,718 A | * | 1/1988 | Yamamoto et al. ........... 396/355 |
| 5,768,644 A | * | 6/1998 | Tanabe ........................... 396/358 |
| 6,003,999 A | * | 12/1999 | Kitaoka et al. ................ 359/872 |
| 2009/0296180 A1 | * | 12/2009 | Negita ........................ 359/223.1 |

FOREIGN PATENT DOCUMENTS

| | | |
|---|---|---|
| DE | 40 19 276 A1 | 1/1971 |
| DE | 2 062 217 A1 | 1/1972 |
| DE | 26 26 150 A1 | 1/1977 |
| DE | 25 42 076 A1 | 3/1977 |
| EP | 1 612 600 A1 | 1/2006 |
| GB | 2 233 774 A | 1/1991 |
| JP | 7-13260 A | 1/1995 |
| JP | 07013260 A * | 1/1995 ............. G03B 19/12 |

OTHER PUBLICATIONS

Translation of JP Publication No. 07-013260; Title: Submirror Driving Device for Single Lens Reflex Camera; Inventors: Tsuchidate et el.; Publication Date: Jan. 17, 1995.*

* cited by examiner

*Primary Examiner* — Clayton E LaBalle
*Assistant Examiner* — Fang-Chi Chang
(74) *Attorney, Agent, or Firm* — Foley & Lardner LLP

(57) ABSTRACT

A mirror arrangement for reflex cameras is provided. A main mirror is pivotably connected to a steering lever, which is rotatable about a rotary spindle, such that the main mirror is pivoted and lowered during transition into the lower position. A secondary mirror is rotatably mounted to a housing via a pivot arm that is arranged pivotably about a rotary spindle that is fixed to the housing. The rotary spindle of the pivot arm is parallel to the rotary spindle of the steering lever. The mirror arrangement further comprises an actuating lever, which is connected to the main mirror and the pivot arm of the secondary mirror. The actuating lever is configured to provide simultaneous movement of the main mirror and of the secondary mirror from the upper position into the lower position and vice versa.

10 Claims, 4 Drawing Sheets

MIRROR ARRANGEMENT FOR REFLEX CAMERAS

BACKGROUND OF THE INVENTION

The invention relates to a mirror arrangement for reflex cameras having the features of the preamble of claim 1.

For the purpose of visually viewing the recording object in a reflex camera, the light coming from the objective is projected onto a matte focusing screen via a main mirror, which is pivotably mounted in the camera housing. Through a partially transmissive zone in the main mirror, a second detail image of the recording object is formed in an intermediate image plane of an autofocus device or a light metering arrangement usually arranged in the bottom of the camera housing via a secondary mirror that is pivotably mounted on the main mirror. The autofocus device here indicates in a known manner the sharpness state of the recording object in the form of a deviation of the intermediate image plane from a desired position.

For the purpose of recording an image, the main mirror is pivoted upward out of the imaging beam path and the secondary mirror that is rotatably mounted on the main mirror is placed against the main mirror. In order to avoid stray light from the eyepiece region, the secondary mirror here covers the partially transmissive zone in the main mirror.

A permanently exact position of the secondary mirror as part of the autofocus device is a necessary prerequisite since very small deviations of the intermediate image plane from the desired position must be identified for very precise automatic focusing.

For the purpose of viewing the recording object, the main mirror is placed generally at 45° with respect to the optical axis of the objective in the beam path to the image plane, with the distances from the matte focusing screen and from the image plane being equal. The dimension of the surface area of the main mirror is matched to the image field to be recorded. The installation space for the main mirror must in this case be dimensioned such that, while the main mirror is pivoted in and out of the imaging beam path, its front edge does not collide with the lens that is last in the direction of light or the mount of the objective placed into the camera.

The distance of the light exit surface of the last lens from the image plane is referred to as back-vertex focal length. For objectives with a short focal length, short back-vertex focal lengths are advantageous for improving the optical power. The aim is therefore to shorten the installation space for the main mirror without having to limit its surface area for the image transfer to the matte focusing screen.

It is known to perform the pivoting movement of a flap not about a spindle which is fixed to the housing but to connect to the connecting rod of a four-bar mechanism. The front edge of the flap in this case performs a movement path that is flattened with respect to a circular path and permits the shortening of the installation space for the flap. If such a connected movement is selected for the main mirror and the secondary mirror is pivotably mounted on the main mirror, the point of articulation of the secondary mirror, during the adjustment of the pivoted-in end position of the main mirror, performs, due to the connected movement of the main mirror, a movement which results in misalignment of the secondary mirror. This is not the case in the case of single mounting of the main mirror in a fixed pivot joint because the secondary mirror moves practically exclusively in the mirror plane during the adjustment of the main mirror. This is true in particular when the two mirrors are located at an angle of about 90° relative to each other. In addition, only two rotational points with play negatively affect the exact position of the secondary mirror in contrast to four-bar mechanisms.

A mirror arrangement for an electronic reflex camera is known from EP 1 612 600 A1. The camera includes an optical and an electronic viewfinder system. The partially transmissive main mirror is mounted pivotably on a lever which itself is mounted rotatably in the camera housing.

For the purpose of recording an image, the lever is pivoted into a position parallel to the matte focusing screen and the main mirror is pivoted into a position that is aligned with the lever. Additional stops must be pivoted-in in order to avoid entry of stray light from the eyepiece region.

In order to view the recording object via the optical viewfinder system, the lever is rotated into an inclined position and the main mirror is orientated at 45° with respect to the optical axis of the objective. Arranged downstream of the partially transmissive main mirror is a driven secondary mirror, which is mounted separately in the lower camera housing and guides part of the imaging beam bundle onto an autofocus detector.

In order to observe the recording object via the electronic viewfinder system, the secondary mirror is pivoted into a neutral position outside the autofocus beam path and the main mirror on the lever is pivoted into a position which corresponds to the position of the secondary mirror in the case of optical viewfinding. The imaging beams passing through the main mirror are incident on a CCD image sensor and the imaging beams reflected on the main mirror are incident on the autofocus detector. The mechanical complexity for mounting and for driving the two mirror systems independently from one another is very great.

SUMMARY OF THE INVENTION

The invention is therefore based on the problem of at least maintaining, for autofocus detection, the precision of single main-mirror mounting with a secondary mirror without having to do without the advantages of a four-bar linkage for reducing the necessary installation space. The number of components necessary for mounting and driving should be comparable with those in single main-mirror mounting.

This problem is solved in a mirror arrangement of the type mentioned in the introduction according to the invention by way of the characterizing features of claim 1. Advantageous embodiments follow from the features of the dependent claims.

According to the invention, the secondary mirror is not attached to the main mirror but is mounted rotatably about a spindle which is arranged in the housing parallel to the rotary spindle of the main mirror and likewise above the optical axis of the objective. The movement path of the secondary mirror is thus independent of the more complex movement path of the main mirror. The secondary mirror is driven via a connecting lug from the driving crank of the main mirror.

It can also be driven via a specially formed curved disk or link disk by way of direct driving by the driving crank. The number of required components is therefore in principle not greater than in the previously known solution described in the introduction. Likewise as is the case in the previously known solution, a residual play in the drive and a mechanical flip-flop with a spring ensure that the secondary mirror comes to rest against adjustment abutments in a spring-mounted fashion upon reaching the two end positions. In the image recording position, the secondary mirror continues to rest against the main mirror such that the semi-transmissive region thereof is covered. For this reason no special measures are necessary for preventing entry of light from the eyepiece side.

BRIEF DESCRIPTION OF THE DRAWINGS

One exemplary embodiment of the invention is shown schematically in the drawing and will be explained in more detail below with reference to the figures, in which.

DETAILED DESCRIPTION OF EMBODIMENTS OF THE INVENTION

Figure 1:
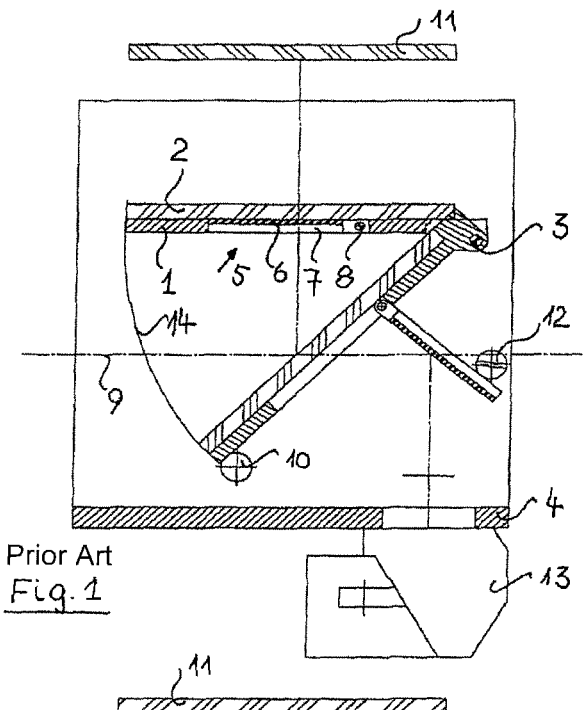
FIG. 1 shows a known mirror arrangement with single rotary spindle on the main mirror.

In a known mirror arrangement with a single pivot spindle according to FIG. 1, the main-mirror carrier 1 with the main mirror 2 is mounted such that they can pivot about a pivot spindle 3. The pivot spindle 3 is fixed in a housing 4. The main-mirror carrier 1 contains a central region 5 in which, in the upper position, a secondary mirror 6 is mounted on a secondary-mirror carrier 7. The main mirror 2 is partially transmissive at least in the central region 5. The main mirror 2 can also be partially transmissive in its entirety, in which case the main-mirror carrier 1 prevents the transmission of beams outside the central region 5.

The secondary-mirror carrier 7 is mounted in the main-mirror carrier 1 such that it can pivot about a pivot spindle 8. In the upper position in FIG. 1, the main mirror 2 and the secondary mirror 6 are situated in a common plane.

After the main-mirror carrier 1 with the main mirror 2 has pivoted about the pivot spindle 3 into the lower position, the main mirror 2 is at 45° with respect to the optical axis 9 of an objective (not shown in more detail). The drive means for pivoting the mirror arrangement are likewise not shown.

The lower position of the main mirror 2 can be adjusted via a settable abutment 10 such that the optical axis 9 is deflected at the main mirror 2 by 90° perpendicularly upward onto a matte focusing screen 11.

The secondary mirror 6 is in this lower position inclined by 90° relative to the main mirror 2. The drive means for this are not shown in further detail. The optical axis 9 is deflected at the secondary mirror 6 by 90° downward, wherein the correct angular position of the secondary mirror 6 can be adjusted by means of a further abutment 12. The imaging beams reflected at the secondary mirror 6 are directed onto an optoelectronic metering arrangement 13 (not shown in further detail), such as an autofocus device, for example.

The installation space required for the mirror arrangement is determined by the downward motion 14 of the front edge of the main mirror 2 as it transitions from the upper into the lower position and by the bottom edge of the secondary mirror 6 when it rests against the abutment 12.

Figure 2:
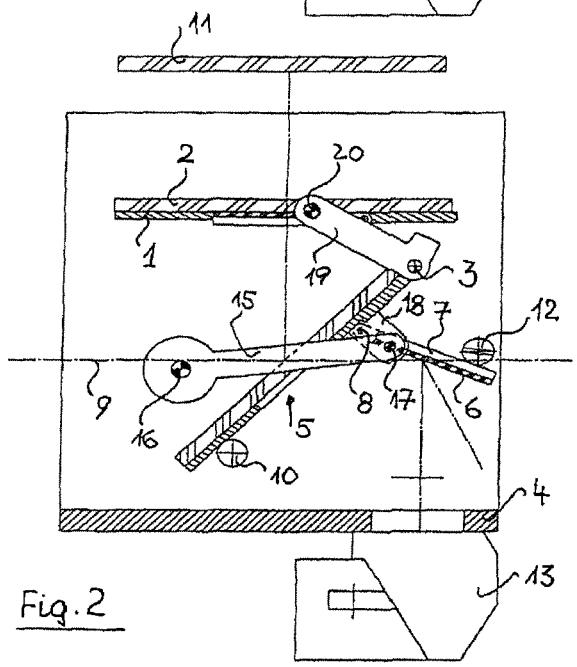
FIG. 2 shows the same mirror arrangement with four-bar mechanism on the main mirror.

FIG. 2 shows the same mirror arrangement as in FIG. 1, but here the main-mirror carrier 1 is connected to the connecting rod of a four-bar mechanism. The four-bar mechanism consists of an actuating lever 15, which is connected in an articulated manner about a rotary spindle 16, which is fixed to the housing, to a lug 17 on the main-mirror carrier 1. The pivot spindle 3 of the main mirror 2 is no longer fixed to the housing but mounted on a steering lever 19 which acts as a rocker. The actuating lever 15 moves the main-mirror carrier 1 from the upper into the lower position and vice versa during a rotation about its rotary spindle 16.

FIG. 2 shows that, in the lower position, the pivot spindle 3 of the main-mirror carrier 1 is lowered from the plane of the upper position into the housing 4. However, as a result, the rotary bearing 8 of the secondary-mirror carrier 7 also moves downward when the secondary-mirror carrier 7 rests against abutment 12, and thus strongly affects in a negative fashion the sensitive position of the secondary-mirror plane for the deflection of the imaging beams onto the optoelectronic metering arrangement 13. This is not the case in the arrangement according to FIG. 1 because even great changes in the position of the main-mirror carrier 1, for example by rotation at the abutment 10, result in the secondary-mirror carrier 7 being displaced practically only parallel in the direction of the secondary-mirror plane, which does not affect the adjustment of the secondary mirror 6. In FIG. 2, if the abutment 10 needs to be readjusted for the main-mirror carrier 1, the abutment 12 also needs to be adjusted again. This results in additional time spent during installation and during maintenance work.

Figure 3:
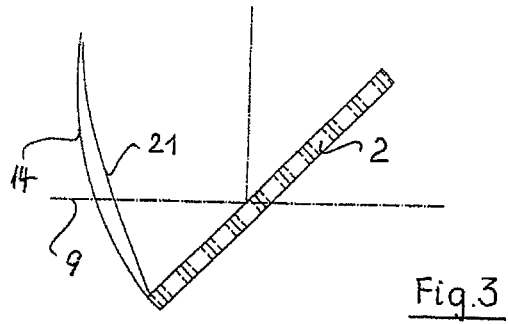
FIG. 3 shows the movement paths of the front edge of the main mirror as in FIGS. 1 and 2.

FIG. 3 schematically shows the flattened movement path 21 of the front edge of the main mirror 2 achieved by a four-bar mechanism as compared to the customary circular path 14 for a single-spindle arrangement.

Figure 4A:
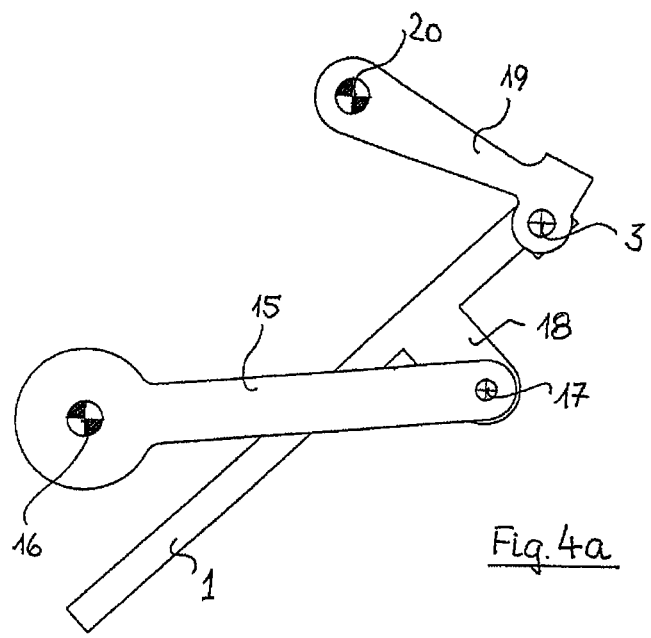
FIG. 4a shows a four-bar lever arrangement with mirror carrier in the lower position.
Figure 4B:
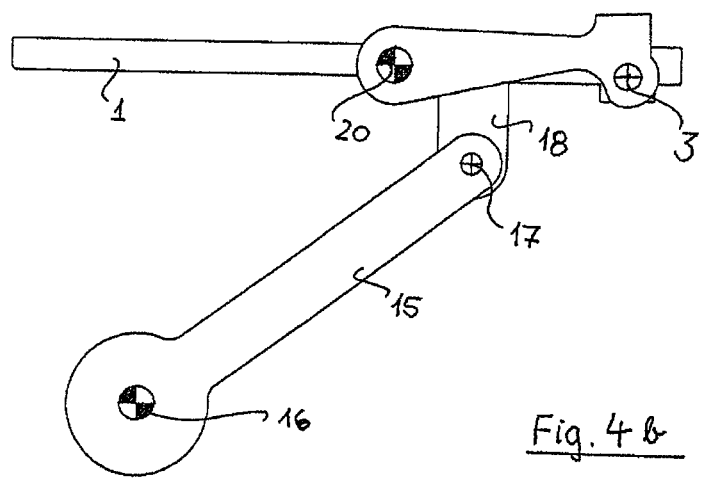
FIG. 4b shows a four-bar lever arrangement with mirror carrier in the upper position.

FIG. 4a shows the geometry of the four-bar mechanism for the main-mirror carrier 1 in the lower position. The rotary spindles 16 and 20 are fixed to the housing. The articulation spindle 17, which is connected to the lug 18, and the pivot spindle 3, which is connected to the steering lever 19, move in the drawing plane during the pivoting of the main-mirror carrier 1 by rotating the actuating lever 15 about its rotary spindle 16 into the upper position, as is shown in FIG. 4b.

Figure 5A:
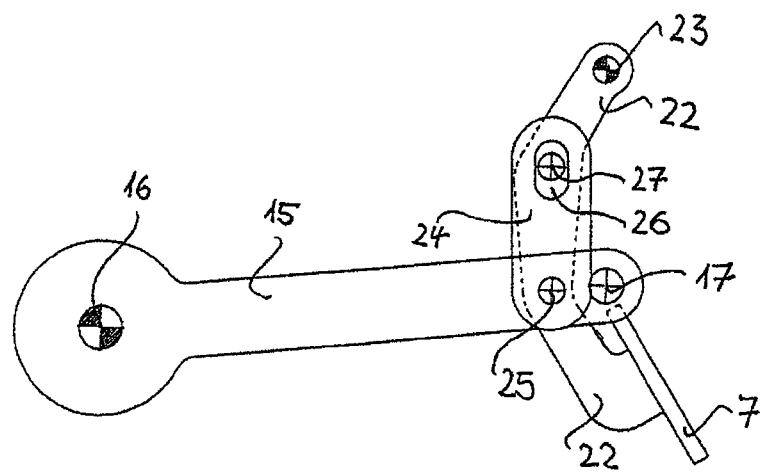
FIG. 5a shows a connecting lug, attached to the actuating lever of the four-bar lever arrangement, to the secondary-mirror carrier in the lower position.

FIG. 5a schematically shows the arrangement of the secondary-mirror carrier 7 on a pivot arm 22. The pivot arm 22 is mounted rotatably on a rotary spindle 23, which is fixed to the housing, and is thus rotatable independently of the four-bar movement of the main-mirror carrier 1. The end positions of the secondary mirror 6 and of the main mirror 2 can therefore be adjusted independently of one another.

The pivot arm 22 is connected to the actuating lever 15 of the main-mirror carrier 1 via a connecting lug 24 such that a connected movement process exists between the upper and lower positions for the main mirror 2 and the secondary mirror 6 using a common drive. The connecting lug 24 is mounted on the actuating lever 15 rotatably about an articulation spindle 25. On the other end, the connecting lug 24 has an elongate hole 26, into which a pin 27, mounted to the pivot arm 22, engages. The guidance of the pin 27 in the elongate hole 26 is necessary for adjusting the lower end position of the secondary mirror 6 independently of the adjustment of the lower end position of the main mirror 2, which by necessity results in a rotation of the actuating lever 15 about the rotary spindle 16.

Figure 5B:
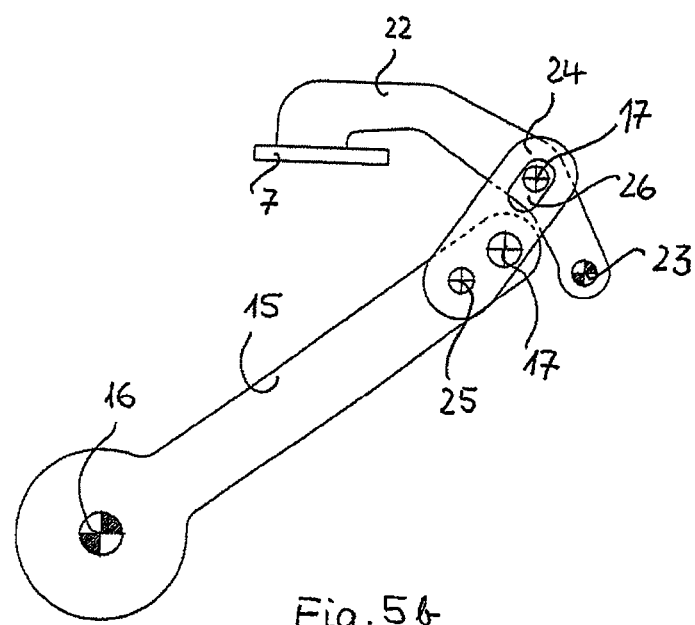
FIG. 5b shows a connecting lug, attached to the actuating lever of the four-bar lever arrangement, to the secondary-mirror carrier in the upper position.

FIG. 5b shows the secondary-mirror carrier 7 in the upper position.

Figure 6:
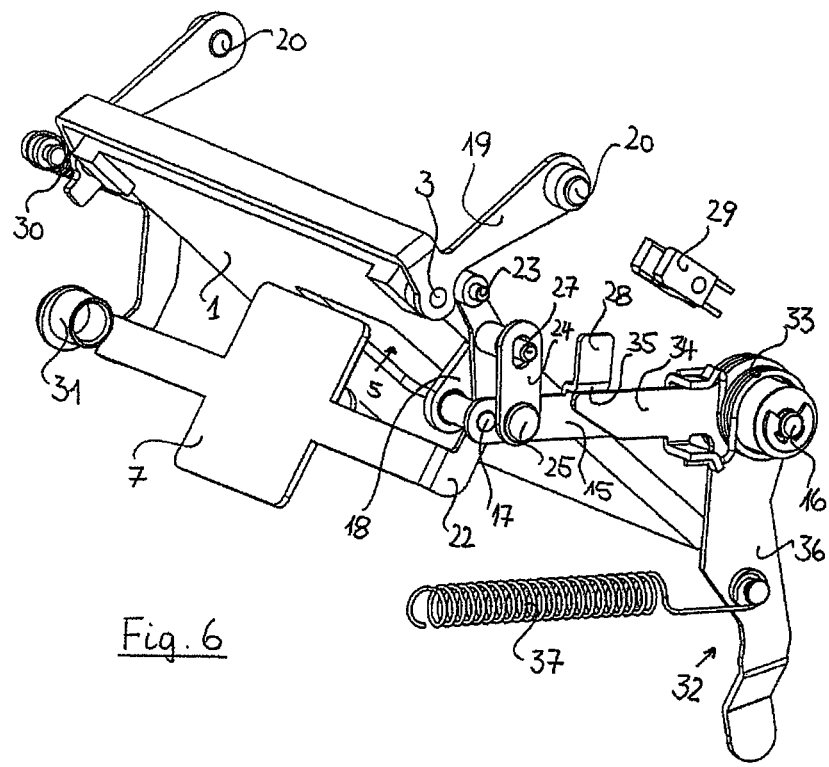
FIG. 6 shows a perspective illustration of the mirror arrangement in the lower end position and FIG. 7 shows a perspective illustration of the mirror arrangement in the upper end position.
Figure 7:
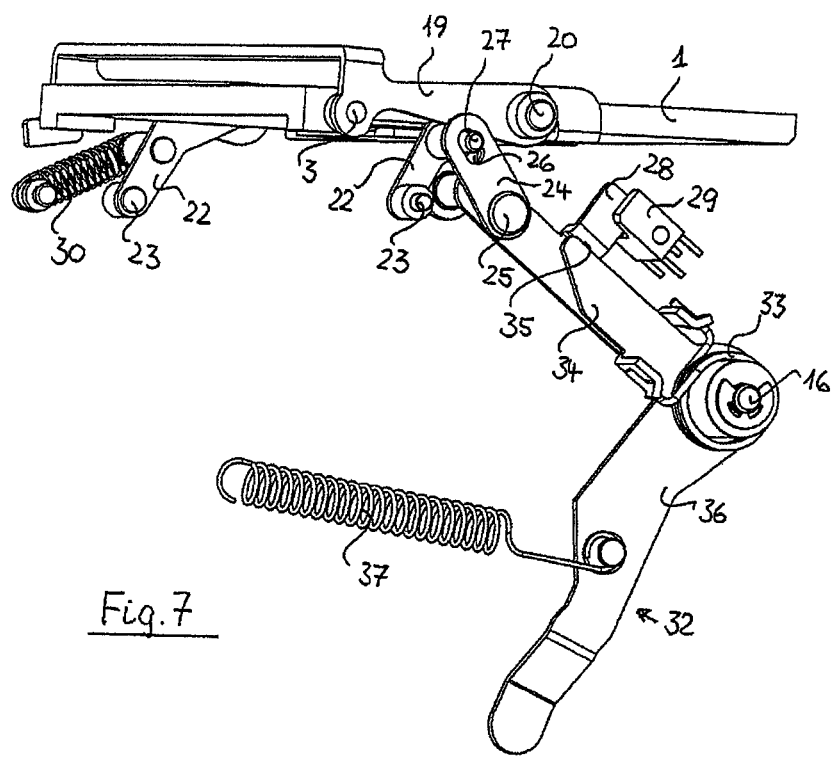

FIG. 6 and FIG. 7 show, in a perspective view, the mirror arrangement in the lower and in the upper position. The steering lever 19 is U-shaped, with the main-mirror carrier 1 being arranged between the U limbs. The free ends of the U limbs are mounted rotatably in the housing (not illustrated) via the rotary spindles 20. The main-mirror carrier 1 is mounted on the base ends of the U limbs in pivot spindles 3. The lug 18, which is connected to the actuating lever 15 via the articulated spindle 17, is arranged on the underside of the main-mirror carrier 1 such that it is spaced apart from the pivot spindle 3.

The secondary-mirror carrier 7 is part of the likewise U-shaped pivot arm 22. The free ends of the U limbs of the pivot arm 22 are mounted in the housing (not illustrated) via the rotary spindles 23. The pin 27, which engages into the elongate hole 26 in the connecting lug 24, is arranged on a first of the U limbs. The connecting lug 24 is connected in an articulated fashion on the actuating lever 15 via the articulation spindle 25.

A tab 28 is molded on the actuating lever 15, which tab 28 interrupts a light barrier 29 in the upper position and thus indicates the unblocking of the imaging beam path to the image plane.

A tension spring 30, which is connected to the housing, is attached to a second one of the U limps of the pivot arm 22. The tension spring 30 ensures in the upper position (FIG. 7) a fixed resting of the secondary-mirror carrier 7 against the main-mirror carrier 1. In the lower position (FIG. 6), the tension spring 30 ensures a fixed resting of the pivot arm 22 against an adjustable abutment 31 which is in the form of an excenter. The tension spring 30 is arranged in a manner such that it expands to a maximum extent when the pivot arm 22 transitions from the upper region into the lower region, with the result that stable tensile forces occur in the upper and lower positions (flip-flop arrangement).

The actuating lever 15 is connected to a two-armed driving crank 32, which is placed onto the rotary spindle 16, which is fixed to the appliance. The positive-locking connection between driving crank 32 and actuating lever 15 takes place via a rotatable overload spring 33, which presses a first arm 34 of the driving crank 32 against an abutment 35 on the actuating lever 15. In the case of excess travel of the driving crank 32 during the downward movement of the actuating lever 15, the arm 34 of the driving crank 32 lifts off the abutment 35 and prevents damage to the levers and bearings of the mirror arrangement. The driving crank 32 is also disconnected from the actuating lever 15 if the main-mirror carrier 1 comes into contact with an obstacle during the downward movement or is lifted up manually during installation.

The other arm 36 of the driving crank 32 is connected to a return spring 37, which is attached to the housing. When the mirror arrangement is tilted up into the upper position, the return spring 37 pulls the driving crank 31 which then takes with it the actuating lever 15 via the first arm 34 due to the positive-locking resting against the abutment 35.

LIST OF REFERENCE SIGNS 1 main-mirror carrier
2 main mirror
3 pivot spindle main mirror
4 housing
5 central region main mirror
6 secondary mirror
7 secondary-mirror carrier
8 pivot spindle secondary-mirror carrier
9 optical axis
10 abutment main-mirror carrier
11 matte focusing screen
12 abutment secondary-mirror carrier
13 optoelectronic metering arrangement
14 downward movement front edge main mirror
15 actuating lever
16 rotary spindle actuating lever
17 articulation spindle lug
18 lug on main-mirror carrier
19 steering lever
20 rotary spindle steering lever
21 flattened movement path
22 pivot arm
23 rotary spindle pivot arm
24 connecting lug
25 articulation spindle connecting lug
26 elongate hole
27 pin
28 tab
29 light barrier
30 tension spring
31 adjustable abutment
32 driving crank
33 overload spring
34 a first arm of the driving crank
35 abutment on the actuating lever
36 other arm of the driving crank
37 return spring

The invention claimed is:

1. A mirror arrangement for reflex cameras, comprising:
a main mirror, which is pivotable in a housing; and
a pivotable secondary mirror,
wherein the main mirror is partially transmissive in a central region,
wherein the secondary mirror is arranged downstream of the partially transmissive region in a direction of light coming from an objective,
wherein the secondary mirror is matched to the partially transmissive region in terms of its size,
wherein, in an upper position, both mirrors are situated in one plane,
wherein, in a lower position, the main mirror is aligned at 45° with respect to the upper position, and the secondary mirror is aligned such that it is tilted with respect to the main mirror,
wherein the main mirror is pivotably connected to a steering lever, which is rotatable about a rotary spindle, such that the main mirror is pivoted and lowered during transition into the lower position,
wherein the secondary mirror is rotatably mounted to the housing via a pivot arm that is immovably attached to the secondary mirror and arranged pivotably about a rotary spindle that is fixed to the housing, the rotary spindle of the pivot arm being parallel to the rotary spindle of the steering lever, and
wherein the mirror arrangement further comprises an actuating lever, which is connected to the main mirror and the pivot arm of the secondary mirror, the actuating lever being configured to provide simultaneous movement of the main mirror and of the secondary mirror from the upper position into the lower position and vice versa.

2. The mirror arrangement as claimed in claim 1, wherein the steering lever is U-shaped and the main mirror is arranged between U limbs of the steering lever, with the free ends of the U limbs being mounted rotatably in the housing and the main mirror being mounted rotatably at the base ends of the U limbs.

3. The mirror arrangement as claimed in claim 1, wherein a lug connecting the main mirror to the actuating lever is arranged on the underside of the main mirror such that the lug is spaced apart from a pivot spindle of the main mirror on the steering lever.

4. The mirror arrangement as claimed in claim 1, wherein the pivot arm that is connected to the secondary mirror is U-shaped, with free ends of the U limbs of the pivot arm being rotatably mounted to the housing and the secondary mirror being connected to a base of the U-shaped pivot arm between the U limbs.

5. The mirror arrangement as claimed in claim 1, wherein a connecting lug, which has an elongate hole, is rotatably mounted to the actuating lever, with the connecting lug being in engagement with a pin on the pivot arm via the elongate hole.

6. The mirror arrangement as claimed in claim 1, wherein the actuating lever is rotatably mounted to the housing.

7. The mirror arrangement as claimed in claim 1, wherein a tab configured to interrupt a light barrier in the upper position of the mirror arrangement is attached to the actuating lever.

8. The mirror arrangement as claimed in claim 1, wherein abutments for the pivot movement of the main mirror and of the pivot arm of the secondary mirror are attached to the housing.

9. The mirror arrangement as claimed in claim 8, wherein the pivot arm of the secondary mirror is connected to a tension spring, which is attached to the housing and is configured to provide secure resting of the secondary mirror on the main mirror in the upper position, and secure resting of the pivot arm on one of the abutments in the lower position.

10. The mirror arrangement as claimed in claim 8, wherein the actuating lever is connected to a driving crank via an overload spring in a rotary bearing, which driving crank itself is connected to a return spring, which is attached to the housing.

\* \* \* \* \*